US012060798B2

(12) United States Patent
Sengupta et al.

(10) Patent No.: US 12,060,798 B2
(45) Date of Patent: Aug. 13, 2024

(54) SURFACE TREATMENT FOR SEAL ASSEMBLIES

(71) Applicant: General Electric Company, Schenectady, NY (US)

(72) Inventors: Arundhati Sengupta, Bengaluru (IN); Ravindra Shankar Ganiger, Bengaluru (IN); Anand Madihalli Srinivasan, Bengaluru (IN); Scott Francis Wolfer, Evendale, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 18/199,249

(22) Filed: May 18, 2023

(65) Prior Publication Data

US 2023/0383669 A1 Nov. 30, 2023

(30) Foreign Application Priority Data

May 27, 2022 (IN) ............................. 202211030463

(51) Int. Cl.

*F01D 11/00* (2006.01)
*F01D 11/02* (2006.01)

(52) U.S. Cl.

CPC ............ *F01D 11/003* (2013.01); *F01D 11/00* (2013.01); *F01D 11/02* (2013.01); *F05D 2240/55* (2013.01); *F05D 2300/611* (2013.01)

(58) Field of Classification Search

CPC ........ F01D 11/00; F01D 11/003; F01D 11/02; F05D 2240/55; F05D 2300/611

See application file for complete search history.

(56) References Cited

U.S. PATENT DOCUMENTS

| | | | |
|---|---|---|---|
| 7,837,199 B2 | 11/2010 | Craig et al. |
| 10,781,709 B2 | 9/2020 | Sen et al. |

(Continued)

FOREIGN PATENT DOCUMENTS

| | | |
|---|---|---|
| DE | 102012010603 | 11/2013 |
| DE | 102019002064 A1 * | 9/2020 |
| EP | 3388719 A1 | 10/2018 |

OTHER PUBLICATIONS

Ding et al., "One-Step Preparation of Highly Hydrophobic and Oleophilic Melamine Sponges via Metal-Ion-Induced Wettability Transition," *ACS Applied Materials and Interfaces*, vol. 10, pp. 6652-6660 (Jan. 2018).

(Continued)

*Primary Examiner* — Audrey B. Walter
(74) *Attorney, Agent, or Firm* — Klarquist Sparkman, LLP

(57) ABSTRACT

This disclosure is directed to seal assemblies for a turbomachine. The seal assemblies include stationary and rotating components and at least one interface between the stationary and rotating components. In some examples, seal assembly includes an oleophilic coating disposed between the stationary and rotating components. The seal assembly may include a surface texture to enhance the oleophilicity of the surface coating disposed between the stationary and rotating components. In other examples, the seal assembly includes an oleophobic coating disposed between the stationary and rotating components. The seal assembly may include a surface texture to enhance the oleophobicity of the surface coating. During operation, the oleophilic seal assembly features retain lubricant between the stationary and rotating components and the oleophobic seal assembly features inhibit the escape of lubricant from the contact regions between the stationary and rotating components.

15 Claims, 7 Drawing Sheets

(56) References Cited

U.S. PATENT DOCUMENTS

| | | | | |
|---|---|---|---|---|
| 2009/0066033 | A1 * | 3/2009 | Lusted | F16J 15/406 277/411 |
| 2011/0021098 | A1 * | 1/2011 | Tabellion | D06M 23/08 252/8.61 |
| 2013/0147123 | A1 * | 6/2013 | Davies | F01D 25/183 277/348 |
| 2015/0267816 | A1 | 9/2015 | Boskovski | |
| 2020/0088055 | A1 | 3/2020 | Stoyanov et al. | |
| 2020/0165977 | A1 * | 5/2020 | Nicolas | F02C 7/28 |
| 2020/0300122 | A1 | 9/2020 | Anglin et al. | |
| 2020/0309032 | A1 * | 10/2020 | Mason | F02C 7/06 |
| 2022/0106891 | A1 * | 4/2022 | Kojima | F16C 17/04 |

OTHER PUBLICATIONS

Hao et al., "Tribological Properties of Textured Cemented Carbide Surfaces of Different Wettability Produced by Pulse Laser," *Journal of Micro and Nano-Manufacturing*, 6(2):021001, 9 pages (Jun. 2018).

Kessman et al., "Tribology of water and oil repellent sol-gel coatings for optical applications," *W E A R*, vol. 267, Issues 1-4, pp. 614-618 (Jun. 2009).

Wojciechowski et al., "Impact of morphological furrows as lubricant reservoir on creation of oleophilic and oleophobic behaviour of metallic surfaces in scuffing," *Tribology International*, vol. 116, pp. 320-328 (Dec. 2017).

* cited by examiner

SURFACE TREATMENT FOR SEAL ASSEMBLIES

CROSS REFERENCE TO RELATED APPLICATION

This application claims the benefit of India Patent Application No. 202211030463, filed on May 27, 2022, which is incorporated by reference herein in its entirety.

FIELD

The present disclosure relates to turbomachine engine seals and surface coating materials for use with the turbomachine engine seals.

BACKGROUND

Turbomachines typically include a rotor assembly, a compressor, and a turbine. The rotor assembly may include a fan having an array of fan blades extending radially outwardly from a rotating shaft. The rotating shaft, which transfers power and rotary motion from the turbine to the compressor and the rotor assembly, is supported longitudinally using a plurality of bearing assemblies. Known bearing assemblies include one or more rolling elements supported within a paired race. To maintain a rotor critical speed margin, the rotor assembly is typically supported on three bearing assemblies: one thrust bearing assembly and two roller bearing assemblies. The thrust bearing assembly supports the rotor shaft and minimizes axial and radial movement thereof, while the roller bearing assemblies support radial movement of the rotor shaft.

Typically, these bearing assemblies are enclosed within a housing disposed radially around the bearing assembly. The housing forms a compartment or sump that holds a lubricant (for example, oil) for lubricating the bearing. This lubricant may also lubricate gears and other seals. Gaps between the housing and the rotor shaft permit rotation of the rotor shaft relative to the housing. The bearing sealing system usually includes two such gaps: one on the upstream end and another on the downstream end. In this respect, a seal disposed in each gap prevents the lubricant from escaping the compartment. Further, the air around the sump may generally be at a higher pressure than the sump to reduce the amount of lubricant that leaks from the sump. Further, one or more gaps and corresponding seals are generally positioned upstream and/or downstream of the sump to create the higher-pressure region surrounding the sump.

Various components of the seals may rotate at high speeds during operation of the turbomachine engine, and others may remain stationary relative to the housing of the turbomachine. For example, the components on one side of a seal interface may rotate along with the rotating shaft of the turbomachine engine, and the components on the other side of the seal interface may remain stationary relative to the engine housing. The high relative speed between the components on opposite sides of the seal interface can generate high amounts of heat, friction, and component wear. The accumulation of heat and the wear of the components at the seal requires that the seal components be replaced periodically, and that the engine be routinely maintained.

Accordingly, there is a need for improved seal assemblies with improved lubrication at the moving seal interfaces to reduce heat accumulation and wear at the seal interface.

DETAILED DESCRIPTION

Figure 1:
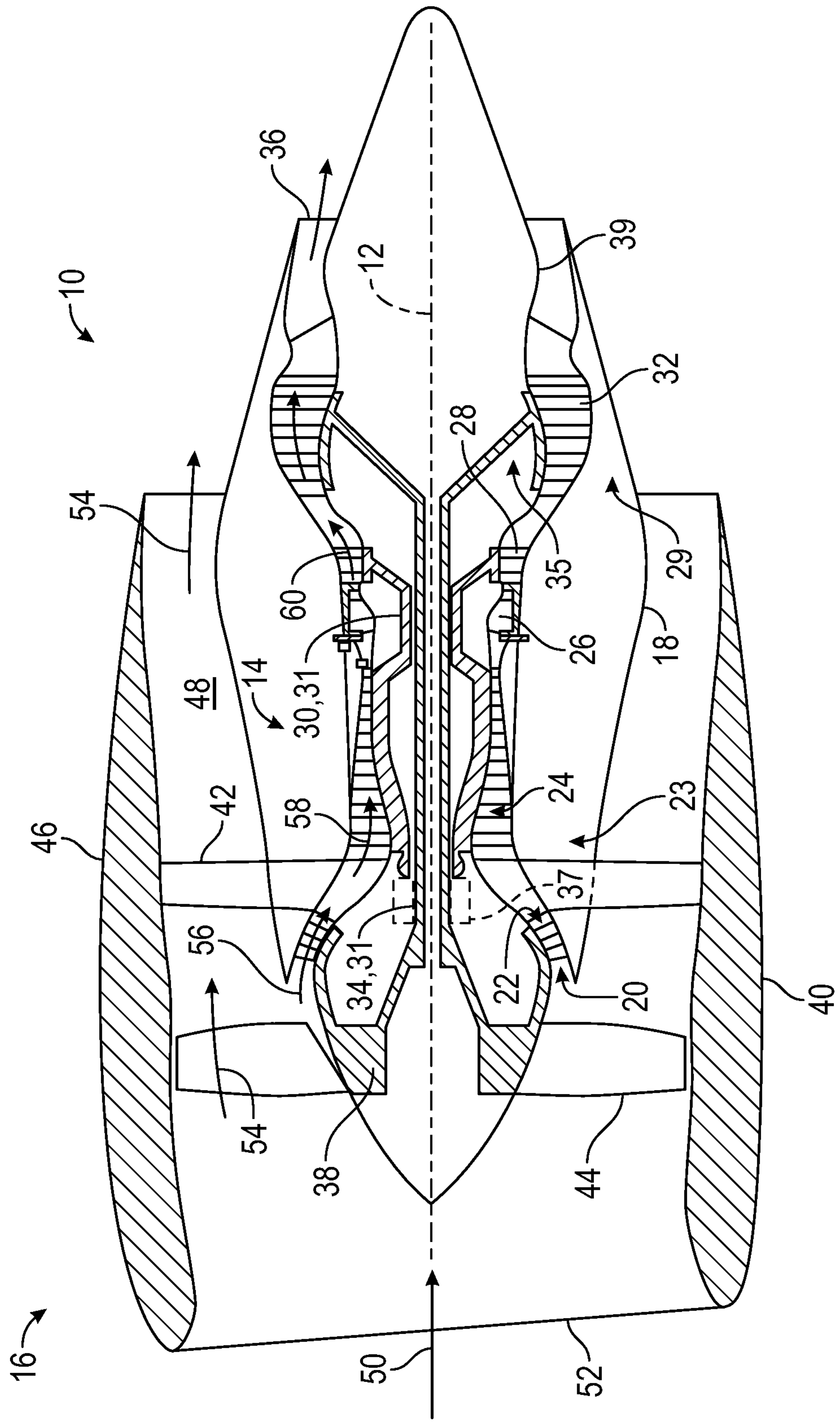
FIG. 1 illustrates a schematic side view of an example turbomachine engine.

Reference now will be made in detail to preferred examples, one or more examples of which are illustrated in the drawings. Each example is provided by way of explanation, not limitation of the preferred examples. In fact, it will be apparent to those skilled in the art that various modifications and variations can be made in the examples discussed without departing from the scope or spirit of disclosure. For instance, features illustrated or described as part of one example can be used with another example to yield a still further example. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

As used herein, the terms "first" and "second" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The terms "communicate," "communicating," "communicative," and the like refer to both direct communication as well as indirect communication such as through a memory system or another intermediary system.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin.

Here and throughout the specification and claims, range limitations are combined, and interchanged, such ranges are identified and include all the sub-ranges contained therein unless context or language indicates otherwise. For example, all ranges disclosed herein are inclusive of the endpoints, and the endpoints are independently combinable with each other.

Disclosed herein are examples of turbomachines and seal assemblies for use with turbomachines. The turbomachine may include a rotating shaft extending along a centerline axis and a fixed housing positioned exterior to the rotating shaft in a radial direction relative to the centerline axis. The seal assembly may include a sump housing at least partially defining a bearing compartment for holding a cooling lubricant. The seal assembly may further include a bearing supporting the rotating shaft. In addition, the seal assembly may also include a sump seal at least partially defining the bearing compartment. A pressurized housing of the seal assembly may be positioned exterior to the sump housing and define a pressurized compartment to at least partially enclose the sump housing. Further, a seal may be positioned between the rotating shaft and the pressurized housing to at least partially define the pressurized compartment to enclose the sump housing.

In certain examples, a seal assembly including a self-lubricating lattice material may allow for a more efficient turbomachine. A self-lubricating lattice material disposed between the rotating portions of a seal assembly and the static portions of the seal assembly can reduce the wear of the various seal assembly components that are in rotating contact with one another when the turbomachine is in an operational condition. Additionally, the use of a self-lubricating lattice material can mitigate heat buildup along the operational seal interface. In some examples, the self-lubricating lattice can be permeated with a lubricant and/or a coolant. For example, a self-lubricating lattice material can be deposited between a rotating runner and a static sealing element so as to form a lubricant layer between the runner and the sealing element when the turbomachine engine is operational.

It should be appreciated that, although the present subject matter will generally be described herein with reference to a gas turbine engine, the disclosed systems and methods may generally be used on bearings and/or seals within any suitable type of turbine engine, including aircraft-based turbine engines, land-based turbine engines, and/or steam turbine engines. Further, though the present subject matter is generally described in reference to a high-pressure spool of a turbine engine, it should also be appreciated that the disclosed system and method can be used on any spool within a turbine engine, for example, a low-pressure spool or an intermediate pressure spool.

Referring now to the drawings, FIG. 1 illustrates a cross-sectional view of one example of a turbomachine 10, also referred to herein as turbomachine engine 10. More particularly, FIG. 1 depicts the turbomachine 10 configured as a gas turbine engine that may be utilized within an aircraft in accordance with aspects of the present subject matter. The gas turbine engine is shown having a longitudinal or centerline axis 12, also referred to herein as a centerline, extending therethrough for reference purposes. In general, the engine may include a core engine 14 and a fan section 16 positioned upstream thereof. The core engine 14 may generally include a substantially tubular external housing 18 that defines an annular inlet 20. In addition, the external housing 18 may further enclose and support a compressor section 23. For the example show, the compressor section 23 includes a booster compressor 22 and a high-pressure compressor 24. The booster compressor 22 generally increases the pressure of the air (indicated by arrow 54) that enters the core engine 14 to a first pressure level. The high-pressure compressor 24, such as a multi-stage, axial-flow compressor, may then receive the pressurized air (indicated by arrow 58) from the booster compressor 22 and further increases the pressure of such air. The pressurized air exiting the high-pressure compressor 24 may then flow to a combustor 26 within which fuel is injected into the flow of pressurized air, with the resulting mixture being combusted within the combustor 26.

For the example illustrated, the external housing 18 may further enclose and support a turbine section 29. Further, for the depicted example, the turbine section 29 includes a first, high-pressure turbine 28 and second, low-pressure turbine 32. For the illustrated examples, one or more of the compressors 22, 24 may be drivingly coupled to one or more of the turbines 28, 32 via a rotating shaft 31 extending along the centerline axis 12. For example, high energy combustion products 60 are directed from the combustor 26 along the hot gas path of the engine to the high-pressure turbine 28 for driving the high-pressure compressor 24 via a first, high-pressure drive shaft 30. Subsequently, the combustion products 60 may be directed to the low-pressure turbine 32 for driving the booster compressor 22 and fan section 16 via a second, low-pressure drive shaft 34 generally coaxial with high-pressure drive shaft 30. After driving each of turbines 28 and 32, the combustion products 60 may be expelled from the core engine 14 via an exhaust nozzle 36 to provide propulsive jet thrust. Further, the rotating shaft(s) 31 may be enclosed by a fixed housing 39 extending along the centerline axis 12 and positioned exterior to the rotating shaft 31 in a radial direction relative to the centerline axis 12.

Additionally, as shown in FIG. 1, the fan section 16 of the engine may generally include a rotatable, axial-flow fan rotor assembly 38 surrounded by an annular fan casing 40.

It should be appreciated by those of ordinary skill in the art that the fan casing 40 may be supported relative to the core engine 14 by a plurality of substantially radially-extending, circumferentially-spaced outlet guide vanes 42. As such, the fan casing 40 may enclose the fan rotor assembly 38 and its corresponding fan blades 44. Moreover, a downstream section 46 of the fan casing 40 may extend over an outer portion of the core engine 14 so as to define a secondary, or by-pass, airflow conduit 48 providing additional propulsive jet thrust.

It should be appreciated that, in several examples, the low-pressure drive shaft 34 may be directly coupled to the fan rotor assembly 38 to provide a direct-drive configuration. Alternatively, the low-pressure drive shaft 34 may be coupled to the fan rotor assembly 38 via a speed reduction device 37 (for example, a reduction gear or gearbox or a transmission) to provide an indirect-drive or geared drive configuration. Such a speed reduction device(s) 37 may also be provided between any other suitable shafts and/or spools within the turbomachine engine 10 as desired or required.

During operation of the turbomachine engine 10, it should be appreciated that an initial airflow (indicated in FIG. 1 by arrow 50) may enter the turbomachine engine 10 through an associated inlet 52 of the fan casing 40. For the illustrated example, the airflow then passes through the fan blades 44 and splits into a first compressed airflow (indicated by arrow 54) that moves through the by-pass airflow conduit 48 and a second compressed airflow (indicated by arrow 56) which enters the booster compressor 22. In the depicted example, the pressure of the second compressed airflow 56 is then increased and enters the high-pressure compressor 24 (as indicated by arrow 58). After mixing with fuel and being combusted within the combustor 26, the combustion products 60 may exit the combustor 26 and flow through the high-pressure turbine 28. Thereafter, for the shown example, the combustion products 60 flow through the low-pressure turbine 32 and exit the exhaust nozzle 36 to provide thrust for the engine.

Figure 2:
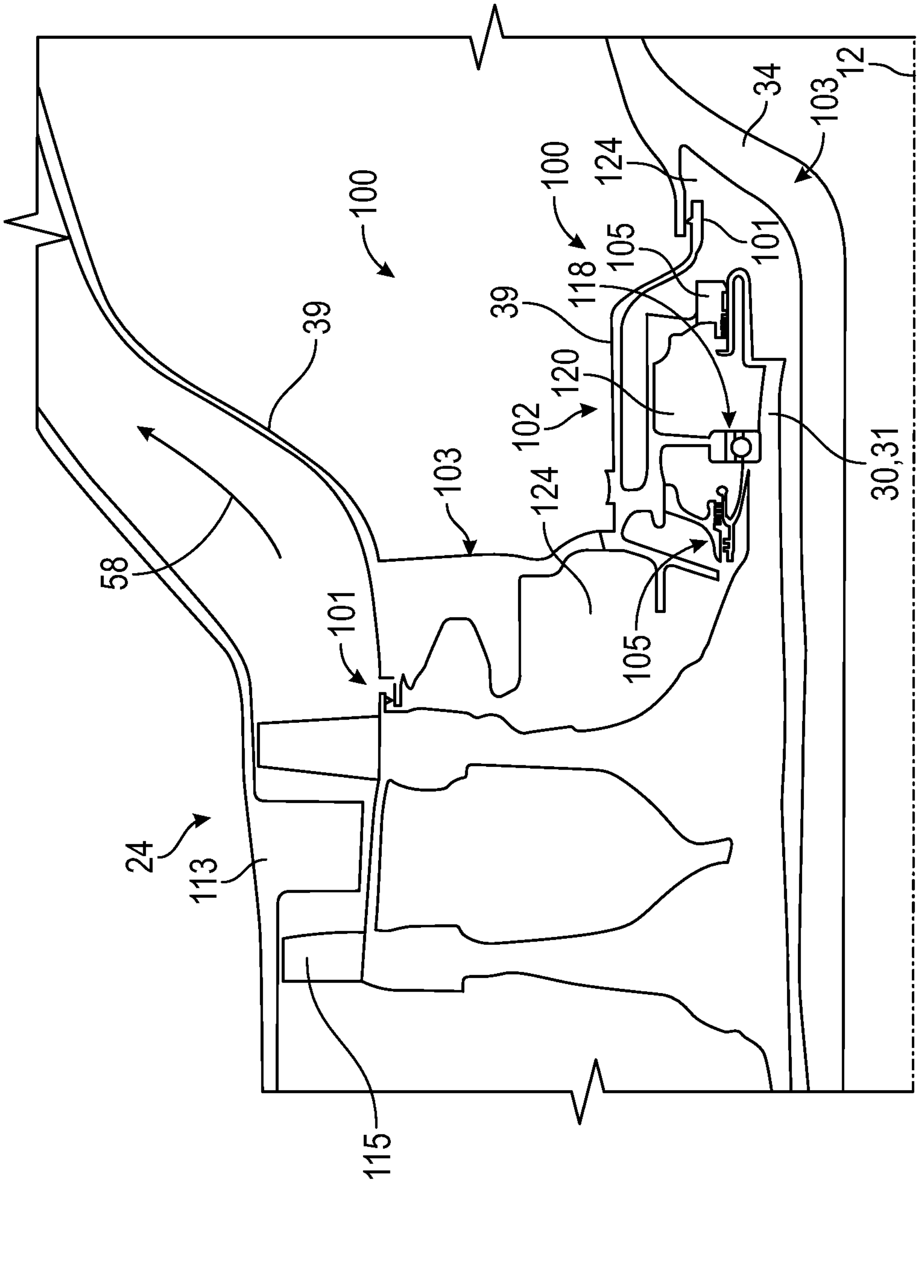
FIG. 2 illustrates a schematic side view of a section of a turbomachine engine including an example of a seal assembly.

Turning now to FIG. 2, the turbomachine engine 10 can include a seal assembly 100, positioned between stationary and rotating components of the turbomachine engine. For example, the seal assembly 100 can be positioned between the stationary and rotating components of the high-pressure compressor 24 described above.

The seal assembly 100 may generally isolate a sump housing 102 from the rest of the turbomachine engine 10. As such, the seal assembly 100 includes the sump housing 102. The sump housing 102 includes at least a portion of the rotating shaft 31 and the fixed housing 39. For example, the fixed housing 39 may include various intermediary components or parts extending from the fixed housing 39 to form a portion of the sump housing 102. Such intermediary components parts may be coupled to the fixed housing 39 or formed integrally with the fixed housing 39. Similarly, the rotating shaft 31 may also include various intermediary components extending from the rotating shaft 31 to form the sump housing. Further, the sump housing 102 at least partially defines a bearing compartment 120 for holding a cooling lubricant (not shown). For instance, the sump housing 102 at least partially radially encloses the cooling lubricant and a bearing 118 (as described in more detail in relation to FIG. 3A). The cooling lubricant (for example, oil) for lubricating the various components of the bearing 118 may circulate through the bearing compartment 120. The seal assembly 100 may include one or more sump seals 105 (as described in more detail in reference to FIGS. 3 and 4) at least partially defining the bearing compartment 120 for holding the cooling lubricant.

The seal assembly 100 further includes a pressurized housing 103 positioned exterior to the sump housing 102. The pressurized housing 103 may at least partially enclose the sump housing 102. For example, as illustrated, the pressurized housing 103 may be positioned both forward and aft relative to the centerline axis 12 of the turbomachine engine 10. The pressurized housing 103 may include at least a portion of the rotating shaft 31 and the fixed housing 39 or intermediary components extending from the rotating shaft 31 and/or the fixed housing 39. For example, the pressurized housing 103 may be formed at least partially by the high-pressure drive shaft 30 and the fixed housing 39 both forward and aft of the sump housing 102.

For the depicted example, the pressurized housing 103 defines a pressurized compartment 124 to at least partially enclose the sump housing 102. In the exemplary example, bleed air from the compressor section 23 (FIG. 1), the turbine section 29 (FIG. 1), and/or the fan section 16 (FIG. 1) may pressurize the pressurized compartment 124 to a pressure relatively greater than the pressure of the bearing compartment 120. As such, the pressurized compartment 124 may prevent or reduce the amount of any cooling lubricant leaking from the sump housing 102 across the sump seal(s) 105.

Further, the seal assembly 100 may include one or more seals to further partially define the pressurized compartment 124 (such as the seal assemblies 200, 400, 500, and 600 as described in more detail in regards to FIGS. 4-11). For instance, one or more sealing elements may be positioned between the rotating shaft 31 and the fixed housing 39.

Figure 3A:
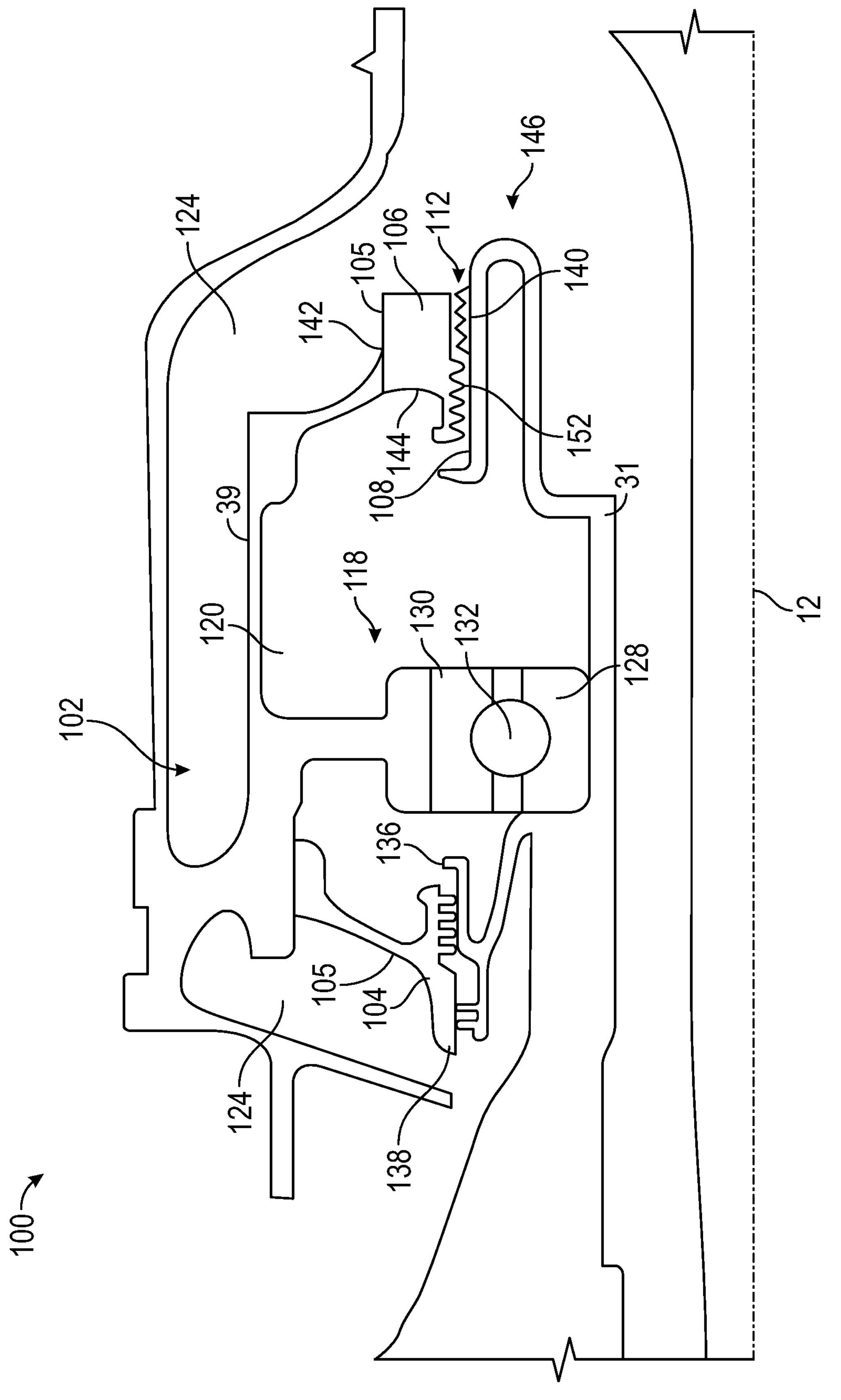
FIG. 3A illustrates an enlarged view of the non-contacting seal assembly depicted in FIG. 2.

Referring now to FIG. 3A, a closer view of the sump housing 102 is illustrated according to aspects of the present disclosure. In the illustrated example, the seal assembly 100 includes the bearing 118. The bearing 118 may be in contact with an exterior surface of the rotating shaft 31 and an interior surface of the fixed housing 39. It should be recognized that the rotating shaft 31 may be the high-pressure drive shaft 30 or the low-pressure drive shaft 34 described in regards to FIG. 1 or any other rotating drive shaft of the turbomachine 10. The bearing 118 may be positioned radially between the portion of the rotating shaft 31 and the portion of the fixed housing 39 that form the sump housing 102. As such, the bearing 118 may be positioned within the sump housing 102. The bearing 118 may support the rotating shaft 31 relative to various fixed components in the engine.

In the depicted example, the bearing 118 may be a thrust bearing. That is, the bearing 118 may support the rotating shaft 31 from loads in the axial, or the axial and radial directions relative to the centerline axis 12. For example, the bearing 118 may include an inner race 128 extending circumferentially around an outer surface of the rotating shaft 31. In the shown example, an outer race 130 is disposed radially outward from the inner race 128 and mates with the fixed housing 39, such as an interior surface of the sump housing 102. The inner and outer races 128, 130 may have a split race configuration. For the depicted example, the inner and outer race 128, 130 may sandwich at least one ball bearing 132 therebetween. Preferably, the inner and outer races 128, 130 sandwich at least three ball bearings 132 therebetween.

In additional examples, the bearing 118 may be a radial bearing. That is, the bearing 118 may support the rotating shaft 31 from loads generally in the radial direction relative to the centerline axis 12. In other examples, the inner race 128 and outer race 130 may sandwich at least one cylinder, cone, or other shaped element to form the bearing 118.

Still referring to FIG. 3A, the seal assembly may include two sump seals 105. Each of a first and second sump seals 105 may be positioned between the rotating shaft 31 and the fixed housing 39 to at least partially define the bearing compartment 120 for housing the cooling lubricant and the bearing 118. For example, the first sump seal 105 may be positioned forward of the bearing 118, and the second sump seal 105 may be positioned aft of the bearing 118. For the illustrated example, the first sump seal 105 may be a labyrinth seal 104, and the second sump seal 105 may be a carbon seal 106. Although, the two sump seals 105 may be any suitable type of seal, and, in other examples, the sealing system may include further sump seals 105, such as three or more. For example, in other examples, multiple labyrinth seals, carbon seals, and/or hydrodynamic seals may be utilized in the sump housing 102 in any arrangement.

FIG. 3A also more closely illustrates the labyrinth seal 104 and the carbon seal 106. For the example depicted, the labyrinth seal 104 and the carbon seal 106 (such as a hydrodynamic seal) are non-contact seals, which do not require contact between the stationary and moving components when operating at high speed. Non-contact seals typically have a longer service life than contact seals. Still, in other examples, one or both of the sump seals 105 may be contact seal. Each type of seal may operate in a different manner. For the depicted example, the labyrinth seal 104 includes an inner surface 136 (coupled to the rotating shaft 31) and an outer surface 138 (coupled to the fixed housing 39). For example, a tortuous path (not shown) extending between the inner and outer surfaces 136, 138 prevents the cooling lubricant from escaping the sump housing 102. For the exemplary example shown, the air pressure on an outer side of the labyrinth seal 104 (that is, in the pressurized compartment 124) is greater than the air pressure on the inner side of the labyrinth seal 104 (that is, in the bearing compartment 120). In this respect, the stationary and rotating components may be separated by an air film (sometimes called an air gap) during relative rotation therebetween.

The carbon seal 106 may, in some examples, be a hydrodynamic or non-contacting seal with one or more grooves 140 that positioned between the stationary and rotating components, as illustrated in FIG. 3A. In general, the hydrodynamic grooves may act as pump to create an air film between the non-contacting carbon seal 106 and the rotating shaft 31. For example, as the rotating shaft 31 rotates, fluid shear may direct air in the radial gap 112 into the hydrodynamic groove(s). As air is directed into the hydrodynamic grooves, the air may be compressed until it exits the hydrodynamic groove(s) and forms the air film to separate the rotating shaft 31 and the non-contacting carbon seal 106. The air film may define a radial gap 112 between the stationary and non-stationary components of the seal assembly 100, as shown in FIG. 3A. Thus, the rotating shaft 31 may ride on the air film instead of contacting the inner sealing surface 108.

In some examples, the carbon seal 106 is proximate to and in sealing engagement with a hairpin member 146 of the rotating shaft 31. In this respect, the hairpin member 146 may contact the carbon seal 106 when the rotating shaft 31 is stationary or rotating at low speeds. Though it should be recognized that the carbon seal 106 may be in sealing engagement with any other part or component of the rotating shaft 31. Nevertheless, for the illustrated hydrodynamic, carbon seal 106, the carbon seal 106 lifts off of the rotating shaft 31 and/or the hairpin member 146 when the rotating shaft 31 rotates at sufficient speeds.

Figure 3B:
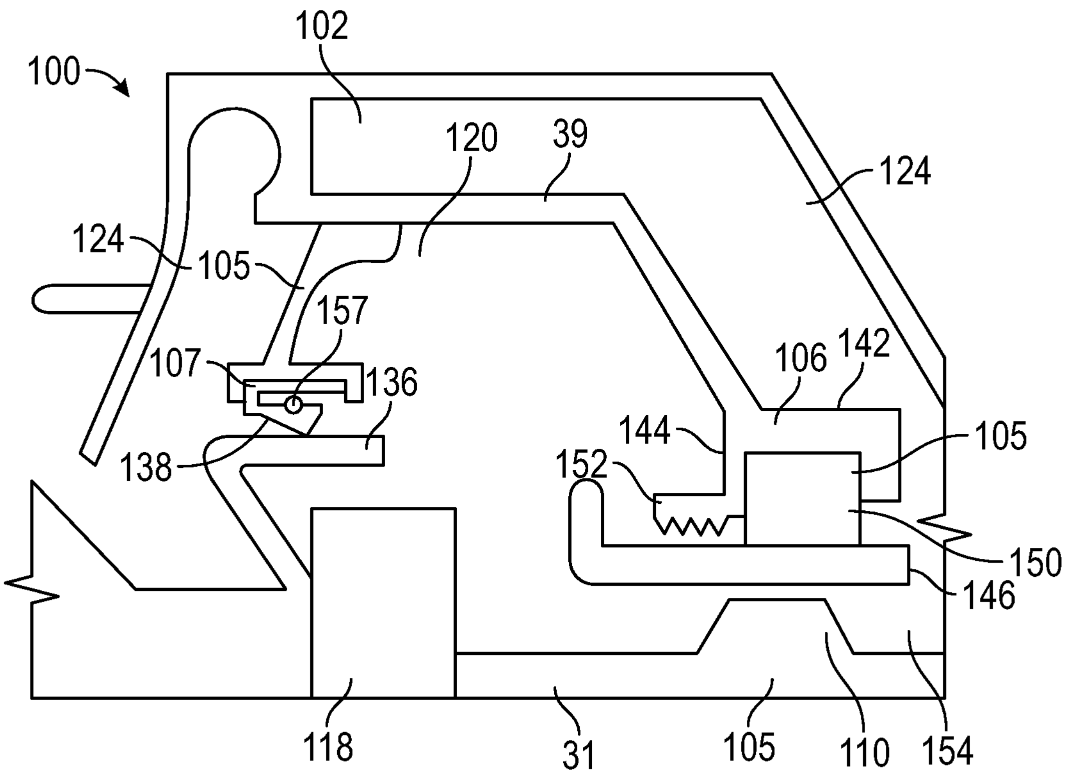
FIG. 3B illustrates a schematic side view of a section of a turbomachine engine including a contact seal assembly.

Referring now to FIG. 3B, a sump housing 102 of a seal assembly 100 is illustrated according to another aspect of the present disclosure. It should be noted that the description of the seal assembly 100 of FIG. 3A applies to like parts of the seal assembly 100 of FIG. 3B unless otherwise noted, and accordingly like parts will be identified with like numerals.

The sump housing 102 of FIG. 3B particularly illustrates the sump housing 102 with three sump seals 105. The sump housing 102 may generally be configured as the sump housing 102 of FIG. 3A. For example, the sump housing 102 may include a portion of the rotating shaft 31, a portion of the fixed housing 39, and enclose the bearing 118. Further, the sump seals 105 and the sump housing 102 at least partially define the bearing compartment 120.

In the example illustrated, one of the sump seals 105 is a contacting lip seal 107. As such, the inner surface 136 and the outer surface 138 may be in contact in order to seal the sump housing 102. Further, a spring 157 may be in compression between the outer surface 138 and the fixed housing 39 to maintain contact between the inner and outer surfaces 136, 138. The illustrated example further includes a carbon seal 106 configured as a contacting carbon seal. As such, the carbon seal 106 includes a carbon element 150 in sealing engagement with the rotating shaft 31. For the example depicted, the carbon element 150 may engage the hairpin member 146 of the rotating shaft 31. Additionally, the carbon seal 106 may include a windback 152 that reduces the amount of the cooling lubricant that reaches the carbon element 150. Further, one of the sump seals 105 may be an open gap seal 110. For instance, the pressure on an outer side 154 (such as the pressurized compartment 124) may be greater than the pressure of the bearing compartment 120 and thus reduce the leakage of cooling lubricant through the open gap seal 110. In further examples, one of the sump seals 105 may be a brush seal. In such examples, the brush seal may contain a plurality of bristles (such as carbon bristles) in sealing engagement between the rotating shaft 31 and the fixed housing 39.

Because components of the seal assembly may rotate at high speeds relative to one another during the operation of the turbomachine engine, heat generation and mechanical wear can arise. Generated heat must be dissipated to support engine operation and to avoid burning off lubricants during engine operation, as well as to prevent thermal expansion of engine components. This challenge may be addressed by reducing the amount of heat generated during the operation of the engine, in turn reducing the amount of heat that must be dissipated. Additionally, wear of the engine components can cause a decrease in operational performance over time and minimizing the wear of the engine components can increase the time an engine may operate before needing repair and maintenance. Both problems may be addressed by adding coolants and lubricants to the rotational seal interface of the seal components and/or selecting low friction materials for those portions of the engine rotating at high speeds relative to one another. However, it may be difficult to ensure that the lubricant remains in the rotational seal interface between the seal components. Seal assemblies and components for seal assemblies to address these needs are discussed in greater detail below.

Another example seal assembly 200 that may be used with the turbomachine engine discussed above is illustrated in FIGS. 4 through 6. It should be noted that the description of the seal assembly 100 of FIGS. 2, 3A and 3B applies to like parts of the seal assembly 200 of FIGS. 4 through 6 unless otherwise noted, and accordingly like parts will be identified with like numerals.

The seal assembly 200, can be positioned between the components of the rotating shaft 31 and the components of the fixed housing 39 and can comprise a runner 202 disposed circumferentially around and statically coupled to the rotating shaft 31 and a sealing element 204 statically coupled to a stationary member 206 of the fixed housing 39.

During the operation of a turbomachine engine 10 that includes the seal assembly 200, the rotation of the rotating shaft 31 causes the corresponding rotation of the runner 202 connected to the rotating shaft 31. The runner 202 contacts the sealing element 204 along an interfacial zone 210. The interfacial zone 210 can, in some examples, form a boundary between two chambers, such as the bearing compartment 120 and the pressurized compartment 124 described above, and accordingly the interfacial zone 210 can, in some examples, prevent the flow of fluids between the two chambers.

Figure 4:
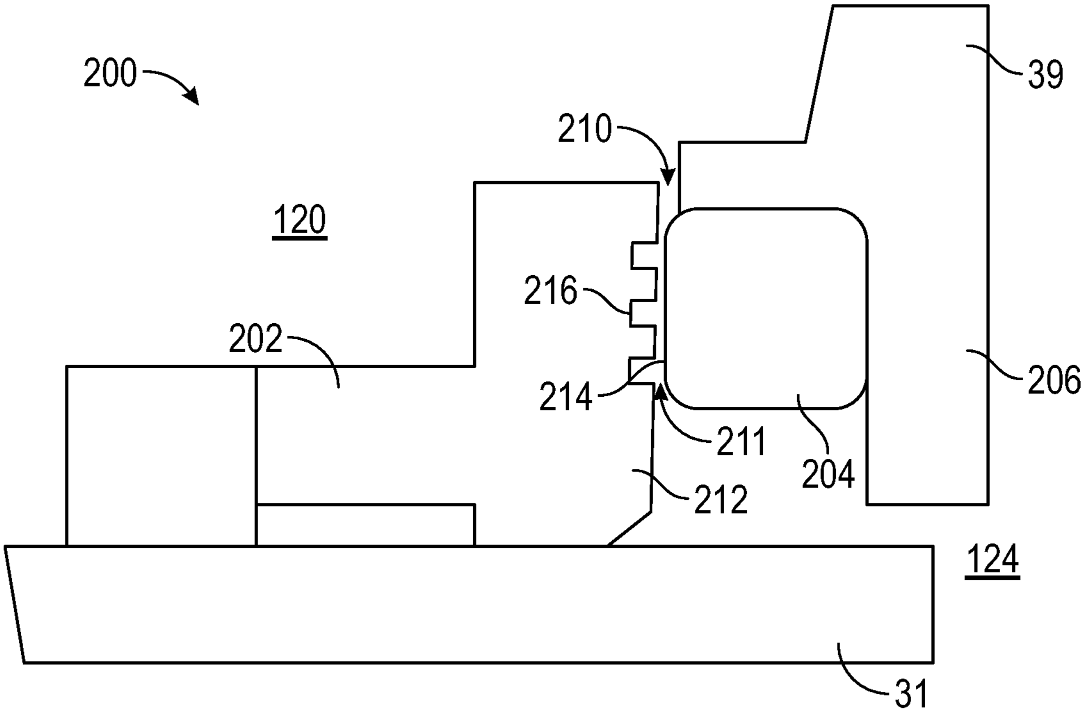
FIG. 4 illustrates a schematic view of a seal assembly according to another example.

In some examples, such as that illustrated in FIG. 4 the seal assembly 200 can be a hydrodynamic seal. In such examples, the sealing element 204 and/or the runner 202 can have hydrodynamic features such as hydrodynamic grooves 216. The hydrodynamic grooves 216 function in substantially the same way as the hydrodynamic grooves in non-contacting hydrodynamic carbon seal 101 described above to create an air cushion in the gap 211 between the first surface 212 of the runner 202 and the first surface 214 sealing element 204. As the rotating shaft 31 and the connected runner 202 rotate relative to the sealing element 204 and the fixed housing 39, the air cushion prevents the sealing element 204 and the runner 202 from coming into contact, while preventing the flow of fluids such as coolant between the two chambers separated by the seal, such as the bearing compartment 120 and the pressurized compartment 124. While FIG. 4 shows a runner having hydrodynamic grooves 216, it is to be understood that in other examples, such as those described below, the seal assembly 200 can include a contacting seal rather than a non-contracting hydrodynamic seal, and in such examples, the grooves 216 may be omitted.

In other examples, the seal assembly 200 can be a contact seal, such as those discussed above. In such examples, the interfacial zone 210 is formed by the contact between a first face 212 of the runner 202 and a second face 214 of the sealing element 204 along a seal interface 203. When the turbomachine engine 10 including the seal assembly 200 is in an operational condition, the first face 212 of the runner 202 can rotate against the second face 214 of the sealing element 204. The friction of the dynamic contact between the first and second faces 212, 214 can cause the second face 214 of the sealing element 204 to wear and/or abrade until it conforms to the surface features of the first face 212 of the runner 202.

Due to the high relative rotational speed between the runner 202 and the sealing element 204 along the interfacial zone 210, it may be advantageous, particularly in examples of seal assembly 200 that includes a contacting seal, to select materials for the runner 202 and the sealing element 204 that both have high thermal conductivity, and which form a low coefficient of dynamic friction along the interfacial zone 210. For instance, in one particular example, the runner 202 can be formed of steel or other hard, non-deforming material, and the sealing element 204 can be formed from carbon. However, it is to be understood that other materials with high thermal conductivity and low coefficient of friction against the material of the runner 202 can be used for the sealing element 204.

Figure 7:
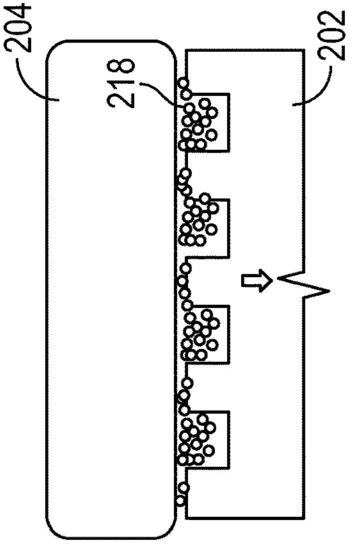
FIG. 7 illustrates a schematic view of a lubricated interface between the sealing element and the runner of the seal assemblies of FIGS. 4-6.

Due to the potential of high wear between the sealing element 204 and the runner 202 when the turbomachine engine including seal assembly 200 is in an operational condition, it is often desirable to add a lubricant 218 at the seal interface 203 between the sealing element 204 and the runner 202, as illustrated in FIG. 7. However, when the sealing element 204 and the runner 202 are operating at high relative rotational speeds, the force of the contact between the first face 212 and the second face 214 along interfacial zone 210 can cause lubricant to be expelled from the area along interfacial zone 210 over time. As such, it can be advantageous in some examples to add a surface coating to one or both of the sealing element 204 and the runner 202 that can reduce or prevent the loss of lubricant from between the sealing element 204 and the runner 202, as discussed in greater detail below.

Figure 6:
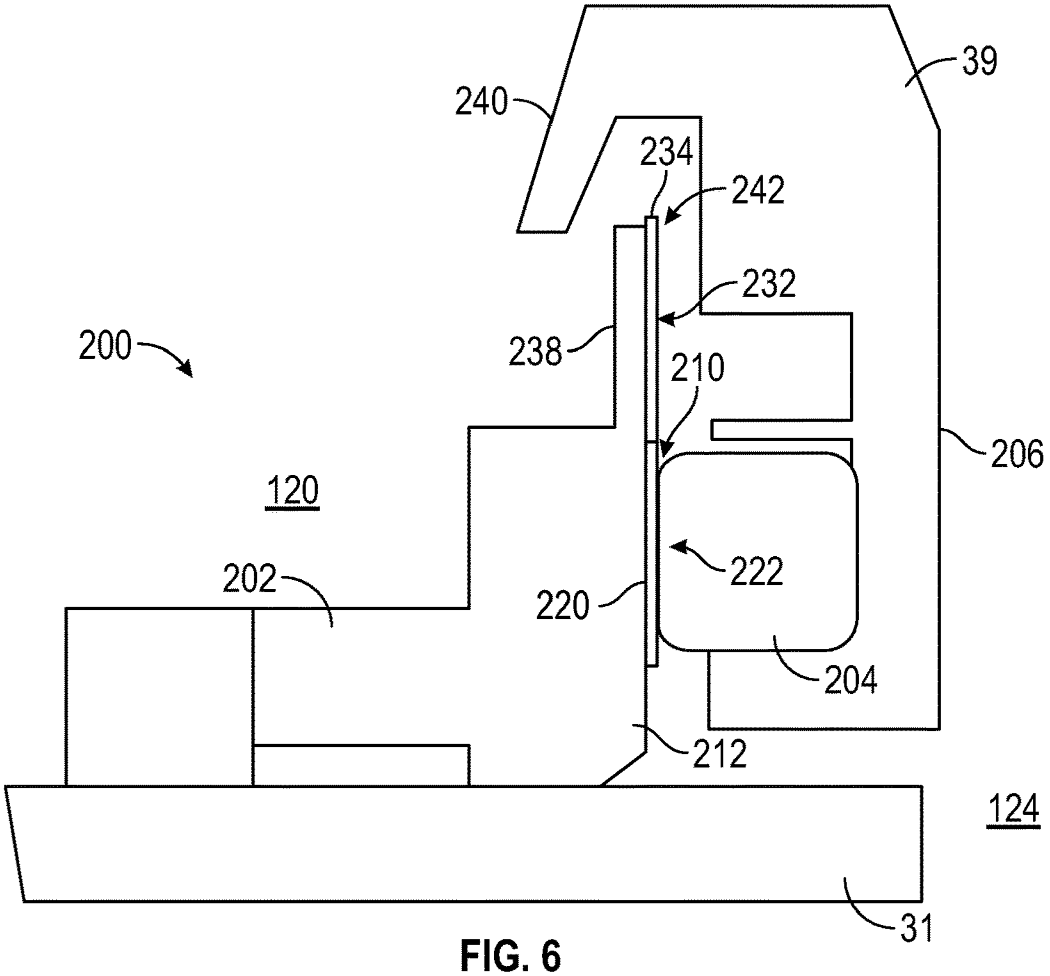
FIG. 6 illustrates a schematic view of a seal assembly according to another example with an oleophilic coating at the seal interface and an oleophobic coating on an extension of the runner.
Figure 9B:
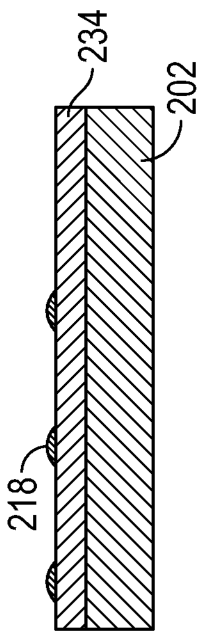
FIG. 9B illustrates a schematic view of a portion of a seal assembly having an oleophilic coating.
Figure 9A:
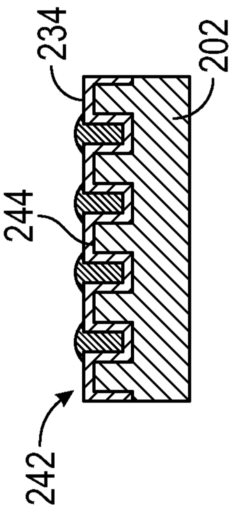
FIG. 9A illustrates a schematic view of a portion of a seal assembly having an oleophilic coating and an oleophilicity-enhancing surface texture.

FIG. 6 illustrates one example seal assembly 200 having an oleophilic coating 220 disposed between the runner 202 and the sealing element 204 along the interfacial zone 210 to form an oleophilic zone 222. The oleophilic coating 220 generally increases the ability of oily materials such as the lubricant 218 to wet (that is, to spread across at a low contact angle) the surface on which it is disposed, as illustrated in FIGS. 9A and 9B. The oleophilic coating 220 can comprise an oleophilic material. The oleophilic material can be an organically modified ceramic, such as silica with an oleophilic active group or boehmite treated with hydrolyzed alkoxysilane and derivatives; a porous sponge-like structure, such as a functionalized polymeric sponge, such as melamine formaldehyde sponge or polyurethane sponge; ceramic-based sponges; carbon, graphite, or graphene; foams, or aerogels. The materials can include oleophilic functionalization groups, and other oleophilic organic, inorganic, or hybrid organic-inorganic materials suitable for retaining, adsorbing, or absorbing the lubricant 218 and able to withstand the operating conditions of the turbomachine engine 10. In some examples, the structure of the oleophilic material used can be monolithic or non-porous. In other examples, the structure of the oleophilic material used can be sponge-like or porous (that is, the structure can comprise a plurality of interconnected pores or voids). Advantageously, the use of a material having a porous structure may allow the oleophilic coating 220 increased surface area for the retention of the lubricant 218. It is to be understood that an oleophilic coating may comprise any such oleophilic material alone or may comprise any number of such materials in combination.

In some examples, such as that illustrated in FIG. 9B, the oleophilic coating 220 can be disposed on the runner 202 of the seal assembly 200. In such examples, the oleophilic coating 220 will rotate relative to the fixed housing 39 along with the runner 202 and will form a rotational interfacial zone 210 between the oleophilic coating 220 and the sealing element 204. In other examples, the oleophilic coating 220 can be disposed on the sealing element 204 of the seal assembly 200. In such examples, the oleophilic coating 220 will remain stationary relative to the fixed housing 39 and will form a rotational interfacial zone 210 with rotating runner 202.

The oleophilic coating 220 can be used alone, as illustrated in FIG. 9B, or combined with a surface texture 224 on the runner 202 or the sealing element 204 to enhance the oleophilic effect of the oleophilic coating 220, as shown in FIG. 9A. The surface texture 224 generally increases the ability of oily substances such as the lubricant 218 to wet the surface of a component such as the runner 202 or the sealing element 204, especially in conjunction with the oleophilic coating 220. In one example, the surface texture 224, as illustrated in FIG. 9A, can comprise an array of micro- or nano-scale columns 226 arranged on the first face 212 of the runner 202 or on the second face 214 of the sealing element 204. As indicated in FIG. 9A, the columns 226 can have a substantially cylindrical shape, but it is to be understood that other geometries may be suitable for improving the oleophilic characteristics of the interfacial zone 210. In some instances, such as that shown in FIG. 9A, the oleophilic coating 220 may cause the lubricant 218 to infiltrate the spaces between the features of the surface texture 224, for greater retention of the lubricant 218 in the interfacial zone 210 shown in FIGS. 4 through 6.

In operation, the oleophilic coating 220, whether in combination with a surface texture 224, as shown in FIG. 9A, or alone, as shown in FIG. 9B, will tend to adsorb, capture, or otherwise retain at least a fraction of the lubricant 218 disposed along the interfacial zone 210 disposed between the runner 202 and the sealing element 204, as illustrated in FIG. 7. In this way, loss of lubricant in the interfacial zone 210 can be prevented or mitigated, and the operational friction between the runner 202 and the sealing element 204 can be reduced. This, in turn, reduces the wear of the contacting portions of the seal, including the runner 202 and the sealing element 204, particularly over long operational periods during which retention of a lubricant layer may be particularly challenging.

The oleophilic coatings 220, described above, with or without surface textures 224, are suitable for use both with the contacting seals and the non-contacting seals previously discussed in this application. When used with contacting seals, the lubricant 218 retained along the interfacial zone 210 may form a thin contiguous or non-contiguous layer between the oleophilic coating 220 and either the runner 202 or the sealing element 204. The layer of the lubricant 218 may conform to the surface features of the runner 202 and/or the sealing element 204, as well as any surface features imparted by either the oleophilic coating 220 or the surface texture 224 and may reduce friction along the interfacial zone 210 as previously described.

When used with non-contacting seals, the lubricant 218 retained along the interfacial zone 210 may form a discrete layer between the air film and the oleophilic coating 220, or the air film and the lubricant 218 may mix to form a mixed air and lubricant film between the oleophilic coating 220 and either the runner 202 or the sealing element 204. The air film, the lubricant layer, and/or the mixed air and lubricant film may conform to the surface features of the runner 202 and/or the sealing element 204, as well as any surface features imparted by either the oleophilic coating 220 or the surface texture 224 and may reduce friction along the interfacial zone 210 as previously described.

Figure 5:
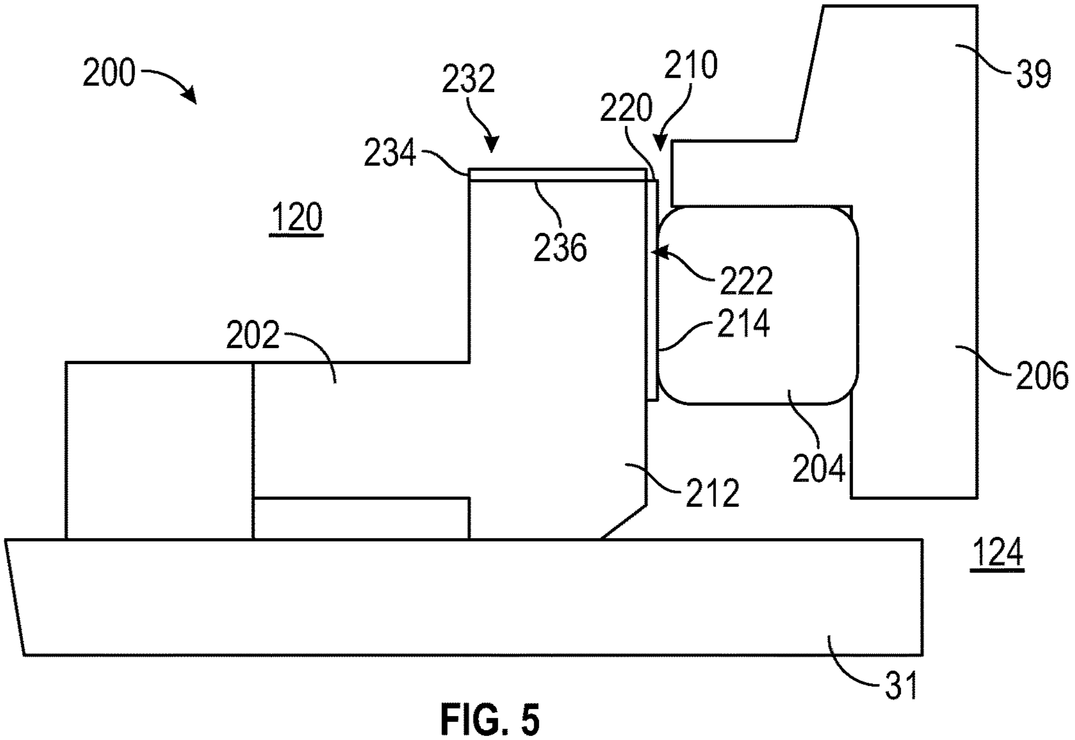
FIG. 5 illustrates a schematic view of a seal assembly according to another example with an oleophilic coating at the seal interface and an oleophobic coating on a perpendicular surface of the runner.

The retention of the lubricant 218 within the interfacial zone 210 can, in some examples, be further improved by the addition of an oleophobic zone 232 (sometimes called oleophobic zone 232) adjacent to the interfacial zone 210 modified with an oleophilic coating 220, as illustrated in FIG. 5. As shown in FIG. 8D, the oleophobic zone 232 can comprise an oleophobic coating 234 disposed along the surface of a portion of the runner 202 positioned away from the interfacial zone 210.

As illustrated in FIG. 5, the oleophobic zone 232 comprising the oleophobic coating 234 can be disposed between the interfacial zone 210 and the bearing compartment 120. The oleophobic coating 234 generally reduces the ability of oily materials such as the lubricant 218 to wet the surface on which it is disposed. In some examples, the oleophobic zone 232 can comprise an oleophobic material that can include a variety of organic, inorganic, and mixed chemistries. For example, the oleophobic material can include a polymer material modified with an oleophobic surface group, and more particularly, ceramics such as silica or boehmite modified with oleophobic surface groups and/or treated with alkoxysilane modified with oleophobic surface groups (for example, a fluoroalkyl group), but it is to be understood that in other examples, the oleophobic coating 234 can comprise any suitably oleophobic material capable of withstanding the operating conditions of the turbomachine engine 10, either alone or in combination.

The oleophobic coating 234 may prevent lubricant 218 from building up on selected surface portions of the runner 202, due to the reduced ability of the lubricant 218 to wet the underlying surface. This reduces the tendency of the lubricant 218 disposed along the interfacial zone 210 between the runner 202 and the sealing element 204 to be expelled from the interfacial zone 210 into the adjacent areas, and/or into the bearing compartment 120, and thus retention of lubricant in the interfacial zone 210 between the runner 202 and the sealing element 204 can be improved.

While FIG. 5 shows an oleophobic coating 234 disposed between the interfacial zone 210 and the bearing compartment 120, it is to be appreciated that in other examples, the oleophobic coating 234 can be disposed on the other side of the interfacial zone 210, between the interfacial zone 210 and the pressurized chamber 124, or on both sides of the interfacial zone as shown in FIG. 5 to prevent oil buildup on those portions of the runner 202 exposed to the pressurized chamber 124, and to discourage oil from escaping the interfacial zone 210. It is also to be understood that, while FIG. 5 shows an oleophobic coating 234 disposed on the runner 202, the oleophobic coating 234 could, in other examples, be disposed along other components adjacent to the interfacial zone 210, such as the fixed housing 39. In some examples, the seal assembly can include a first oleophobic coating 234 disposed radially outwards from the interfacial zone 210 and a second oleophobic coating 234 disposed radially inwards from the interfacial zone 210 (that is, the interfacial zone 210 can be bounded in either radial direction with an oleophilic coating 234 to retain the lubricant 218 along the interfacial zone 210).

FIG. 6 shows an alternative example of seal assembly 200, in which the runner 202 includes a lubricant retention member 238 that extends radially outward from the interfacial zone 210. An oleophilic coating 220 is disposed along the interfacial zone 210 as previously discussed, and an oleophobic zone 232 is formed on the lubricant retention member 238 by including an oleophobic coating 234 on the face of the lubricant retention member 238 that is radially adjacent to the interfacial zone 210. The radially outward position of the lubricant retention member 238 may provide an additional barrier against escape of the lubricant 218 from the interfacial zone 210, as escaping lubricant 218 would need to cross the length of the lubricant retention member 238, and more particularly, across an oleophobic surface (that is, one with poor wettability by oily substances such as the lubricant 218). In some examples, the runner 202 may also include a cowl 240 disposed radially outwards and axially spaced from the retention member 238. Together, the cowl 240 and the retention member 238 can form a tortuous pathway 242 between the bearing compartment 120 and the interfacial zone 210. The tortuous pathway 242 may further reduce the ability of the lubricant 218 to escape from the interfacial zone 210 into the bearing compartment 120.

While FIG. 6 shows an oleophobic coating 234 forming an oleophobic zone 232 disposed radially outwards of the oleophilic coating 220, it is to be understood that in alternative examples, the oleophobic coating 234 could be disposed to form an oleophobic zone 232 radially inwards of the oleophilic coating 220, or the seal assembly could comprise two oleophobic coatings 234 to form two oleophobic zones 232, one disposed radially outwards of the oleophilic coating 220 and one disposed radially inwards of the oleophilic coating 220. In other words, the seal assembly can include an oleophilic zone 232 that is radially adjacent to the interface 203 between the runner 202 and the sealing element 204.

Figure 8A:
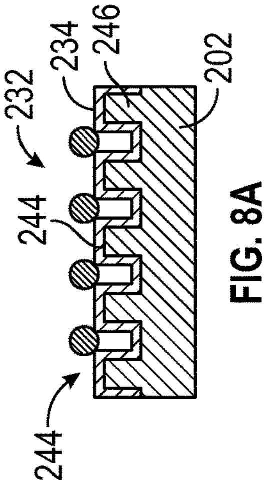
FIG. 8A illustrates a schematic view of a portion of a seal assembly having an oleophobic coating and an oleophobicity-enhancing surface texture according to one example.
Figure 8B:
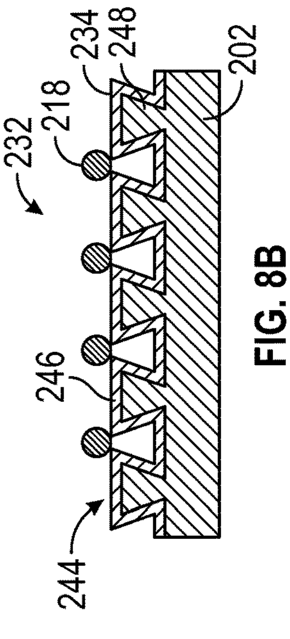
FIG. 8B illustrates a schematic view of a portion of a seal assembly having an oleophobic coating and an oleophobicity-enhancing surface according to another example.
Figure 8C:
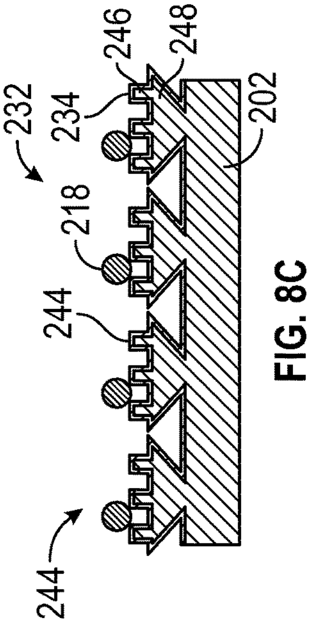
FIG. 8C illustrates a schematic view of a portion of a seal assembly having an oleophobic coating and an oleophobicity-enhancing surface according to another example.
Figure 8D:
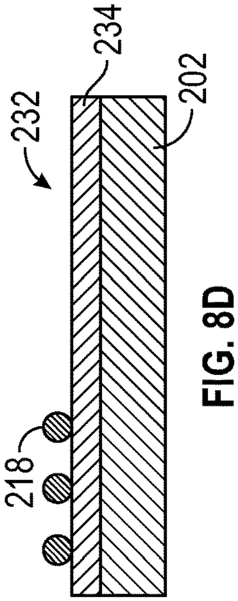
FIG. 8D illustrates a schematic view of a portion of a seal assembly having an oleophobic coating.

In some examples, the oleophobic zone 232 can also include a surface texture 244, such as those illustrated in FIGS. 8A through 8C to enhance the oleophobic effect of the oleophobic coating 234. The oleophobic coating 234 can be disposed along the external surface of the surface texture 244. The surface texture 244 and the oleophobic coating 234 together generally reduce the ability of oily substances such as the lubricant 218 to wet the surface of a component such as the runner 202, the sealing element 204, the fixed housing 39, or the shaft 31. As illustrated in FIGS. 8A through 8C, various surface geometries may enhance the oleophobicity of the oleophobic zone 232. For example, the surface texture 244 can comprise a plurality of micro- or nano-scale columnar structures 246 (FIG. 8A), a plurality of micro- or nano-scale tapered and/or conical structures 248 (FIG. 8B), or a hybrid structure comprising a plurality of micro- or nano-scale columnar structures 246 disposed atop a plurality of micro- or nano-scale tapered and/or conical structures 248 (FIG. 8C). It is to be understood that the surface textures illustrated in FIGS. 8A through 8C are exemplary only, and any surface texture that reduces the ability of oily substances such as the lubricant 218 to wet the underlying component such as runner 202 may be used as the surface texture 244.

In operation, the oleophobic coating 234, with or without the surface texture 244, will tend to repel and prevent accumulation of the lubricant 218 in the regions of the seal assembly 200 adjacent the interfacial zone 210 disposed between the runner 202 and the sealing element 204. In this way, loss of lubricant in the interfacial zone 210 can be prevented or mitigated, and the operational friction between the runner 202 and the sealing element 204 can be reduced. This, in turn, reduces the wear of the contacting portions of the seal assembly 200, including the runner 202 and the sealing element 204, particularly over long operational periods during which retention of a lubricant layer may be particularly challenging. It is to be understood that, while the oleophobic coatings 234 and surface textures 244 are discussed above in the context of their use alongside oleophilic coatings 220 and surface textures 224, oleophilic coatings and oleophobic coatings may be used individually or in combination.

The oleophobic coatings 234 and surface textures 244 described above are suitable for use both with the contacting seals and the non-contacting seals previously discussed in this application. When used with contacting seals, the lubricant 218 prevented from escaping the interfacial zone 210 may form a thin contiguous or non-contiguous layer between the runner 202 and the sealing element 204. The layer of the lubricant 218 may conform to the surface features of the runner 202 and/or the sealing element 204 and may reduce friction along the interfacial zone 210 as previously described.

When used with non-contacting seals, the lubricant 218 retained along the interfacial zone 210 may form a discrete layer between the air film and either the runner 202 or the sealing element 204, or the air film and the lubricant 218 may mix to form a mixed air and lubricant film between the runner 202 and the sealing element 204. The air film, the lubricant layer, and/or the mixed air and lubricant film may conform to the surface features of the runner 202 and/or the sealing element 204 and may reduce friction along the interfacial zone 210 as previously described.

While the examples shown above discuss the use of oleophilic coatings 220, oleophobic coatings 234, and surface textures 224, 244 to create a single oleophilic zone 222 along the interfacial zone 210 and a single oleophobic zone 232 adjacent to the interfacial zone 210, it is to be appreciated that in other examples, multiple oleophilic zones 222 and oleophobic zones 232 may be formed in a pattern to precisely control the distribution of the lubricant 218 within the seal assembly 200. This may advantageously allow for more efficient lubrication of the seal assembly 200, as the lubricant 218 may be directed to regions of higher pressure, wear, and/or heat generation.

The examples previously discussed reduce the loss of lubricant between the moving components of a seal assembly such as seal assembly 200 during the operation of a turbomachine engine such as turbomachine 10. By reducing the losses of lubricant from the seal assembly, these examples help to maintain seal performance during the seal lifetime through the reduction of wear and heat generation between the moving components of the seal assembly.

In view of the above-described implementations of the disclosed subject matter, this application discloses the additional clauses enumerated below. It should be noted that one feature of an example in isolation or more than one feature of the example taken in combination and, optionally, in combination with one or more features of one or more further examples are further examples also falling within the disclosure of this application.

Further aspects of the disclosure are provided by the subject matter of the following clauses:

A turbomachine comprising a rotating shaft extending along a centerline axis and a fixed housing positioned exterior to the rotating shaft in a radial direction relative to the centerline axis, and a seal assembly comprising a runner statically coupled to the rotating shaft, a sealing element statically coupled to the fixed housing, and an oleophilic coating disposed between the runner and the sealing element, wherein the runner rotates along with the rotating shaft and relative to the sealing element when the turbomachine is in an operational condition, and wherein the oleophilic coating retains a lubricant disposed between the runner and the sealing element to reduce a coefficient of friction between the runner and the sealing element.

The turbomachine of any preceding clause, wherein the oleophilic coating is disposed on the runner and rotates along with the runner relative to the sealing element when the turbomachine is in the operational condition.

The turbomachine of any preceding clause, wherein the lubricant is disposed between the oleophilic coating and the sealing element.

The turbomachine of any preceding clause, wherein the oleophilic coating is disposed on the sealing element and remains stationary relative to the turbomachine housing when the turbomachine is in the operational condition The turbomachine of any preceding clause, wherein the lubricant is disposed between the oleophilic coating and the runner.

The turbomachine of any preceding clause wherein one of the runner or the sealing element comprises a surface texture increasing an ability of the lubricant to wet the oleophilic coating.

The turbomachine of any preceding clause, wherein the seal assembly further includes an oleophobic coating disposed radially inwards or radially outwards from the oleophilic coating.

The turbomachine of any preceding clause where the seal assembly further includes a first oleophobic coating disposed radially inwards from the oleophilic coating and a second oleophobic coating disposed radially outwards from the oleophilic coating.

The turbomachine of any preceding clause, wherein the seal assembly further includes a surface texture decreasing an ability of the lubricant to wet the oleophobic coating.

The turbomachine of any preceding clause, wherein the seal assembly comprises a hydrodynamic seal and at least one of the runner or the sealing element comprises a hydrodynamic groove The turbomachine of any preceding clause, wherein the oleophilic coating comprises an organically modified ceramic, a functionalized polymer, or a carbon-based material.

The turbomachine of any preceding clause, wherein the oleophilic coating comprises a porous or sponge-like structure or an aerogel.

A seal assembly for a turbomachine, the turbomachine including a rotating shaft extending along a centerline axis and a fixed housing positioned exterior to the rotating shaft in a radial direction relative to the centerline axis, the seal assembly comprising a runner statically coupled to the rotating shaft, a sealing element statically coupled to the fixed housing, a seal interface defined by contact between a first surface of the runner and a first surface of the sealing element, and an oleophobic zone disposed radially adjacent to the seal interface, wherein the runner rotates along with the rotating shaft and relative to the sealing element when the turbomachine is in an operational condition, wherein the oleophobic zone comprises an oleophobic coating and prevents a lubricant from escaping the seal interface while the turbomachine is in the operational condition.

The seal assembly of any preceding clause, wherein the oleophobic zone comprises an oleophobic coating disposed on a second surface of the runner adjacent to the seal interface.

The seal assembly of any preceding clause, wherein the oleophobic coating comprises a ceramic material modified with an oleophobic surface group or a polymer material modified with an oleophobic surface group.

The seal assembly of any preceding clause, wherein the oleophobic zone comprises a surface texture disposed beneath the oleophobic coating that decreasing an ability of the lubricant to wet the oleophobic coating.

The seal assembly of any preceding clause, further comprising an oleophilic zone disposed along the seal interface on either the first surface of the runner or the first surface of the sealing element, wherein the oleophilic zone comprises a layer of oleophilic material.

The seal assembly of any preceding clause, wherein the seal assembly is a hydrodynamic seal assembly and at least one of the first surface of the runner or the first surface of the sealing element comprises a hydrodynamic groove.

The seal assembly of any preceding clause wherein the seal assembly is included in a sump seal of a turbomachine engine.

The seal assembly of any preceding clause wherein the seal assembly is included in a labyrinth seal of a turbomachine engine.

The seal assembly of any preceding clause wherein the seal assembly is included in an aspirating face seal of a turbomachine engine.

The seal assembly of any preceding clause wherein the seal assembly further comprises a windback configured to reduce the flow of lubricant between the runner and the sealing element.

A seal assembly for a turbomachine, the turbomachine including a rotating shaft extending along a centerline axis and a fixed housing positioned exterior to the rotating shaft in a radial direction relative to the centerline axis, the seal assembly comprising a runner statically coupled to the rotating shaft, a sealing element statically coupled to the fixed housing, a seal interface disposed between the runner and the sealing element, an oleophilic coating disposed along the seal interface, and an oleophobic zone disposed radially adjacent to the seal interface, wherein the runner rotates along with the rotating shaft and relative to the sealing element when the turbomachine is in an operational condition, wherein the oleophilic coating retains a lubricant disposed between the runner and the sealing element to reduce a coefficient of friction between the runner and the sealing element, and wherein the oleophobic zone prevents a lubricant from escaping the seal interface while the turbomachine is in the operational condition.

The seal assembly of any preceding clause, wherein the oleophilic coating comprises an organically modified ceramic, a functionalized polymer, or a carbon-based material.

The seal assembly of any preceding clause, wherein the seal assembly comprises a hydrodynamic seal and at least one of the runner or the sealing element comprises a plurality of hydrodynamic grooves.

The features described herein with regard to any example can be combined with other features described in any one or more of the examples, unless otherwise stated.

In view of the many possible examples to which the principles of the disclosed invention may be applied, it should be recognized that the illustrated examples are only preferred examples of the invention and should not be taken as limiting the scope of the invention. Rather, the scope of the invention is defined by the following claims. We therefore claim as our invention all that comes within the scope and spirit of these claims.

The invention claimed is:

1. A turbomachine comprising, a rotating shaft extending along a centerline axis and a fixed housing positioned exterior to the rotating shaft in a radial direction relative to the centerline axis, and a seal assembly comprising a runner statically coupled to the rotating shaft, a sealing element statically coupled to the fixed housing, and an oleophilic coating disposed between the runner and the sealing element;

wherein the runner is configured to rotate along with the rotating shaft and relative to the sealing element when the turbomachine is in an operational condition, wherein the oleophilic coating is configured to retain a lubricant disposed between the runner and the sealing element to reduce a coefficient of friction between the runner and the sealing element, and wherein the oleophilic coating is disposed on the runner and is configured to rotate along with the runner relative to the sealing element when the turbomachine is in the operational condition.

2. The turbomachine of claim 1, wherein the lubricant is configured to be disposed between the oleophilic coating and the sealing element.

3. The turbomachine of claim 1, wherein the seal assembly comprises a hydrodynamic seal and at least one of the runner or the sealing element comprises a hydrodynamic groove.

4. The turbomachine of claim 1, wherein the oleophilic coating comprises an organically modified ceramic, a functionalized polymer, or a carbon-based material.

5. The turbomachine of claim 1, wherein the oleophilic coating comprises a porous or sponge-like structure or an aerogel.

6. A turbomachine comprising, a rotating shaft extending along a centerline axis and a fixed housing positioned exterior to the rotating shaft in a radial direction relative to the centerline axis, and a seal assembly comprising a runner statically coupled to the rotating shaft, a sealing element statically coupled to the fixed housing, and an oleophilic coating disposed between the runner and the sealing element;

wherein the runner is configured to rotate along with the rotating shaft and relative to the sealing element when the turbomachine is in an operational condition, wherein the oleophilic coating is configured to retain a lubricant disposed between the runner and the sealing element to reduce a coefficient of friction between the runner and the sealing element, wherein the seal assembly further includes an oleophobic coating disposed radially inwards or radially outwards from the oleophilic coating.

7. The turbomachine of claim 6, wherein the seal assembly further includes a surface texture decreasing an ability of the lubricant to wet the oleophobic coating.

8. A seal assembly for a turbomachine, the turbomachine including a rotating shaft extending along a centerline axis and a fixed housing positioned exterior to the rotating shaft in a radial direction relative to the centerline axis, the seal assembly comprising:

a runner statically coupled to the rotating shaft;

a sealing element statically coupled to the fixed housing;

a seal interface defined by contact between a first surface of the runner and a first surface of the sealing element;

an oleophobic zone disposed radially adjacent to the seal interface; and an oleophilic zone disposed along the seal interface on either the first surface of the runner or the first surface of the sealing element, wherein the oleophilic zone comprises a layer of oleophilic material, wherein the runner is configured to rotate along with the rotating shaft and relative to the sealing element when the turbomachine is in an operational condition; and wherein the oleophobic zone comprises an oleophobic coating and is configured to prevent a lubricant from escaping the seal interface while the turbomachine is in the operational condition.

9. The seal assembly of claim 8, wherein the seal assembly is a hydrodynamic seal assembly and at least one of the first surface of the runner or the first surface of the sealing element comprises a hydrodynamic groove.

10. The seal assembly of claim 8, wherein the oleophobic zone comprises the oleophobic coating disposed on a second surface of the runner adjacent to the seal interface.

11. The seal assembly of claim 10, wherein the oleophobic coating comprises a ceramic material modified with an oleophobic surface group or a polymer material modified with an oleophobic surface group.

12. The seal assembly of claim 10, wherein the oleophobic zone comprises a surface texture disposed beneath the oleophobic coating that decreases an ability of the lubricant to wet the oleophobic coating.

13. A seal assembly for a turbomachine, the turbomachine including a rotating shaft extending along a centerline axis and a fixed housing positioned exterior to the rotating shaft in a radial direction relative to the centerline axis, the seal assembly comprising:

a runner statically coupled to the rotating shaft;

a sealing element statically coupled to the fixed housing;

a seal interface disposed between the runner and the sealing element;

an oleophilic coating disposed along the seal interface; and an oleophobic zone disposed radially adjacent to the seal interface;

wherein the runner is configured to rotate along with the rotating shaft and relative to the sealing element when the turbomachine is in an operational condition;

wherein the oleophilic coating is configured to retain a lubricant disposed between the runner and the sealing element to reduce a coefficient of friction between the runner and the sealing element; and wherein the oleophobic zone is configured to prevent a lubricant from escaping the seal interface while the turbomachine is in the operational condition.

14. The seal assembly of claim 13, wherein the oleophilic coating comprises an organically modified ceramic, a functionalized polymer, or a carbon-based material.

15. The seal assembly of claim 13, wherein the seal assembly comprises a hydrodynamic seal and at least one of the runner or the sealing element comprises a plurality of hydrodynamic grooves.

* * * * *